(12) United States Patent
Marando

(10) Patent No.: US 6,519,855 B1
(45) Date of Patent: Feb. 18, 2003

(54) METHOD OF MANUFACTURING A VEHICLE BODY AND FRAME ASSEMBLY

(75) Inventor: Richard A. Marando, Mohrsville, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/650,959

(22) Filed: Aug. 29, 2000

Related U.S. Application Data
(60) Provisional application No. 60/151,788, filed on Aug. 31, 1999.

(51) Int. Cl.$^7$ .............................................. B21D 53/88
(52) U.S. Cl. ........................ 29/897.2; 29/421.1; 29/425
(58) Field of Search ............................. 29/897.2, 421.1, 29/463, 897, 890.053, 890.054, 425, 428, 525.14, 525.13; 72/62, 58, 61, 370.22, 370.25; 228/173.4

(56) References Cited

U.S. PATENT DOCUMENTS

| | | | |
|---|---|---|---|
| 4,759,111 A | | 7/1988 | Cudini |
| 5,333,775 A | | 8/1994 | Bruggemann et al. |
| 5,491,883 A | | 2/1996 | Marlinga |
| 5,557,961 A | * | 9/1996 | Ni et al. .................... 72/61 |
| 5,735,156 A | * | 4/1998 | Yoshitomi et al. ............. 72/58 |
| 6,016,603 A | * | 1/2000 | Marando et al. ........... 29/897.2 |
| 6,105,409 A | * | 8/2000 | Kojima et al. ................. 72/58 |
| 6,138,358 A | * | 10/2000 | Marando .................... 29/897.2 |
| 6,182,487 B1 | * | 2/2001 | Komiya et al. ................ 72/58 |

FOREIGN PATENT DOCUMENTS

| | | | |
|---|---|---|---|
| JP | 56-4325 | * | 1/1981 |
| JP | 61-147930 | * | 7/1986 |
| JP | 6-142792 | * | 5/1994 |

* cited by examiner

*Primary Examiner*—Gregory M. Vidovich
*Assistant Examiner*—T. Nguyen
(74) *Attorney, Agent, or Firm*—MacMillan, Sobanski & Todd, LLC

(57) ABSTRACT

A method for forming a closed channel structural member having a central portion that is enlarged relative to the end portions thereof is disclosed. Initially, first and second tubes are formed in respective hydroforming dies to have desired shapes that are preferably characterized by a relatively large diameter first end portions and relatively small diameter second end portions. Each of the two tubes is then oriented such that the relatively large diameter first end portions are disposed adjacent to one another. Lastly, the relatively large diameter first end portions are joined together in any conventional manner, such as by butt welding, to form a unitary member characterized by a relatively large diameter central portion extending between a pair of relatively small diameter end portions. The unitary member can be used as a component, such as a side rail, of a vehicle body and frame assembly.

6 Claims, 3 Drawing Sheets

METHOD OF MANUFACTURING A VEHICLE BODY AND FRAME ASSEMBLY

CROSS REFERENCE TO RELATED APPLICATION

This application claims the benefit of U.S. Provisional Application No. 60/151,788, filed Aug. 31, 1999, the disclosure of which is incorporated herein by reference.

BACKGROUND OF THE INVENTION

This invention relates in general to methods for manufacturing body and frame assemblies for vehicles. More specifically, this invention relates to an improved method for manufacturing a vehicular body and frame assembly including a pair of side rails, wherein each of the side rails has a central portion that is enlarged relative to the ends portions thereof.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modem vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural members that are secured together, such as by welding, to provide a unitary structural member that extends the entire length of the vehicle body and frame assembly.

Traditionally, the side rails of known vehicle body and frame assemblies have been formed exclusively from open channel structural members, i.e., structural members that have a non-continuous cross sectional shape (U-shaped or C-shaped channel members, for example). Thus, it is known to use a single integral open channel structural member to form a side rail that extends the entire length of the vehicle body and frame assembly, as described above. Additionally, it is known to secure a plurality of such open channel structural members together to form the individual sections of a unitary side rail for a vehicle body and frame assembly, as also described above. However, the use of open channel structural members to form the side rails and cross members for vehicle body and frame assemblies has been found to be undesirable for several reasons. First, it is relatively time consuming and expensive to bend multiple portions of the side rails to conform to a desired final shape, as is commonly necessary. Second, after such bending has been performed, a relatively large number of brackets or other mounting devices must usually be secured to each of the side rails to facilitate the attachment of the various components of the vehicle to the body and frame assembly. Third, in those instances where the side rails are formed from a plurality of individual sections, it has been found difficult to maintain dimensional stability throughout the length of the side rail when the individual side rail sections are secured together.

More recently, it has been proposed to form the side rails and the cross members from closed channel structural members, i.e., structural members that have a continuous cross sectional shape (tubular or box-shaped channel members, for example). In vehicle body and frame assemblies of this type, it is known that the closed channel structural member may be deformed to a desired shape by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member is deformed into the desired final shape.

Hydroforming has been found to be a desirable forming process because portions of a closed channel structural member can be quickly and easily deformed to have a complex cross sectional shape. In those instances where the perimeter of the closed channel structural member is essential the same as the perimeter of the die cavity, the cross sectional shape of the closed channel structural member is changed during the hydroforming process. However, at least ideally, the wall thickness of the closed channel structural member should remain relatively constant throughout the deformed region. Hydroforming has also been found to be a desirable forming process because portions of a closed channel structural member can be quickly and easily expanded from a relatively small perimeter to a relatively large perimeter. In those instances where the perimeter of the closed channel structural member is somewhat smaller than the perimeter of the die cavity, not only is the cross sectional shape of the closed channel structural member changed during the hydroforming process, but the wall thickness thereof is decreased. However, at least ideally, the wall thickness of the closed channel structural member should decrease uniformly through the expanded region.

Such variations in the wall thickness of the closed channel structural member are usually considered to be undesirable because they can result in undesirable weaknesses in the formed closed channel structural member. One solution is to increase the wall thickness of the entire closed channel structural member such that the most extreme reductions in the wall thickness thereof would not adversely affect the overall strength of the member for its intended use. However, such over-designing undesirably increases the overall weight and cost of the closed channel structural member and the resultant vehicle frame component. An alternative solution is to employ a process known as end feeding. End feeding involves applying a mechanical force against one or both end portions of the closed channel structural member simultaneously as the interior portion is expanded. As a result, some of the metallic material of the end portions flows into the interior portion being expanded, thus minimizing the reduction in the wall thickness thereof. End feeding has been found to function satisfactorily in many instances, particularly when the interior portion being expanded is located relatively near to the ends portions, when the overall length of the closed channel structural member is relatively short, and when the shape of the closed channel structural member is relatively straight. This is because the end feeding process is somewhat limited in its ability to cause the metallic material of the end portions of the closed channel structural member to flow into the expanded interior portion.

Unfortunately, it has been found that the side rails and other components of some vehicle body and frame assemblies are sufficiently long or complex in shape as to render the end feeding process ineffective to minimize the undesirable reduction in the wall thickness when the interior portion of the closed channel structural member is expanded during hydroforming. In many instances, it is desirable to expand one or more interior portions of the side rail to provide a desired magnitude of stiffness, especially when the side rail is relatively long, and the distance between the front and rear axles is relatively large. Thus, it would be desirable to provide an improved method for hydroforming a relatively long or complex shaped closed channel structural member that facilitates the use of the end feeding process to minimize the reduction in the wall thickness during expansion.

SUMMARY OF THE INVENTION

This invention relates to an improved method for forming a closed channel structural member having a central portion that is enlarged relative to the end portions thereof. Initially, first and second tubes are formed in respective hydroforming dies to have desired shapes that are preferably characterized by a relatively large diameter first end portions and relatively small diameter second end portions. Each of the two tubes is then oriented such that the relatively large diameter first end portions are disposed adjacent to one another. Lastly, the relatively large diameter first end portions are joined together in any conventional manner, such as by butt welding, to form a unitary member characterized by a relatively large diameter central portion extending between a pair of relatively small diameter end portions. The unitary member can be used as a component, such as a side rail, of a vehicle body and frame assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
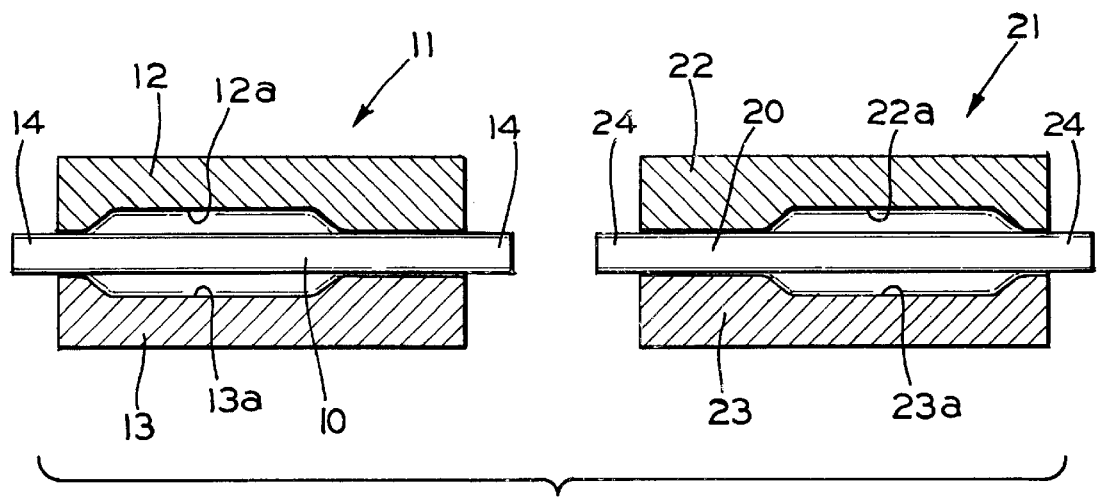
FIG. 1 is a sectional elevational view of a pair of closed channel structural members disposed within respective hydroforming dies prior to the commencement of a hydroforming operation in accordance with the method of this invention.

Referring now to the drawings, there is illustrated in FIG. 1 a first closed channel structural member, such as a first tube 10, that can be used in conjunction with the method of this invention to form a first portion of a vehicle frame component or other desired article. The first tube 10 is conventional in the art and is preferably formed having a uniform wall thickness through the length thereof. The first tube 10 is disposed within a first hydroforming die, indicated generally at 11, that is composed of a first die section 12 and a second die section 13. Although the method of this invention will be explained and illustrated in conjunction with the illustrated linearly extending first tube 10, it will be appreciated that this invention may be practiced with a tube that has been pre-bent, such as in a conventional tube bending apparatus, to have one or more bends therein or that has otherwise been pre-formed in any other known manner.

The length of the illustrated first tube 10 is somewhat greater than the length of the first hydroforming die 11. Thus, end portions 14 of the first tube 10 extend outwardly from the opposed ends of the first hydroforming die 11. The end portions 14 are adapted to be engaged by respective end feed cylinders (not shown) of a first hydroforming apparatus. The end feed cylinders are conventional in the art and are adapted to seal against the respective end portions 14 of the first tube 10 and to conduct pressurized fluid into the interior of the first tube 10 in a manner described further below. The end feed cylinders are also adapted to exert inwardly directed forces on the end portions 14 of the first tube 10 during the hydroforming operation, as will also be described further below.

The die sections 12 and 13 have respective cavity portions 12a and 12b formed therein that cooperate to form a first hydroforming die cavity when the die sections 12 and 13 are moved into engagement with one another as shown. The inner surface of the die cavity of the first hydroforming die 11 preferably corresponds in cross sectional shape to the desired shape for the first tube 10 throughout some or all of the length thereof after the hydroforming operation has been performed. Thus, the inner surface of the die cavity of the first hydroforming die 11 may be formed having any desired shape for the first tube 10. The cavity portions 12a and 12b are preferably formed relatively near to one of the end portions 14 of the first tube 10, for a reason that will be explained below. The perimeters of the cavity portions of the first hydroforming die 11 are somewhat larger than the perimeter of the associated portions first tube 10 extending therethrough. As will be explained in detail below, the perimeter of at least a portion of the first tube 10 will be increased within these enlarged cavity portions of the first hydroforming die 11 during the hydroforming operation.

Figure 2:
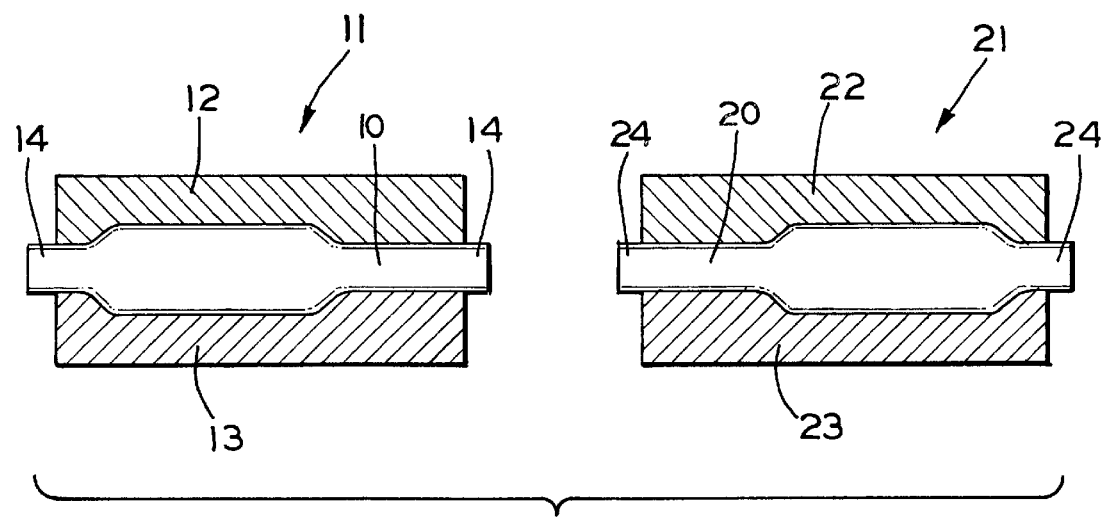
FIG. 2 is a sectional elevational view of the closed channel structural members and the hydroforming dies illustrated in FIG. 1 after the completion of the hydroforming operation.

The hydroforming operation is, of itself, conventional in the art and uses pressurized fluid to deform and expand the first tube 10 into conformance with the die cavity of the first hydroforming die 11. To accomplish this, the end portions 14 of the first tube 10 are initially engaged by the end feed cylinders. Then, the first tube 10 is filled with a pressurized fluid, typically a relatively incompressible liquid such as water. The pressure of the fluid is increased to a magnitude where the first tube 10 is deformed outwardly into conformance with the die cavity. At the same time, the end feed cylinders may, if desired, be operated to exert inwardly directed forces against the end portions 14 of the first tube 10. As a result, the first tube 10 is deformed into the shape illustrated in FIG. 2, wherein the first tube 10 corresponds with the inner surface of the die cavity of the first hydroforming die 11. In the regions of the enlarged cavity portion, the wall thickness of the first tube 10 is reduced somewhat. However, the end feeding process causes some of the end portions 14 of the first tube 10 to be moved inwardly within the first hydroforming die 11 by the end feed cylinders. As a result, the amount of such wall thickness reduction is minimized when the end feeding process performed. It will be appreciated that any conventional apparatus may be used to perform the hydroforming operation.

FIG. 1 further illustrates a second closed channel structural member, such as a second tube 20, that can also be used in conjunction with the method of this invention to form a second portion of a vehicle frame component or other desired article. The second tube 20 may be similar in structure to the first tube 20, although such is not necessary, and may be disposed within a second hydroforming die, indicated generally at 21, that is composed of a first die section 22 and a second die section 23. The length of the illustrated second tube 20 is somewhat greater than the length of the second hydroforming die 21. Thus, end portions 24 of the second tube 20 extend outwardly from the opposed ends of the second hydroforming die 21. The end portions 24 are adapted to be engaged by respective end feed cylinders (not shown) of a second hydroforming apparatus in the manner described above. The die sections 22 and 23 have respective cavity portions 22a and 22b formed therein that cooperate to form a second hydroforming die cavity when the die sections 22 and 23 are moved into engagement with one another as shown. The hydroforming operation for the second tube 20 can be performed in the same manner as described above such that the second tube 20 is also deformed into the shape illustrated in FIG. 2.

The first and second tubes 10 and 20 can be hydroformed simultaneously in the respective hydroforming dies 11 and 21 as shown above. During this operation, the first and second tubes 10 and 20 can be hydroformed to have either similar or dissimilar shapes as desired. Alternatively, the first and second tubes 10 and 20 can be hydroformed sequentially in a single hydroforming die if desired. In this instance, the first and second tubes 10 and 20 will be deformed to have the same shapes.

Figure 3:
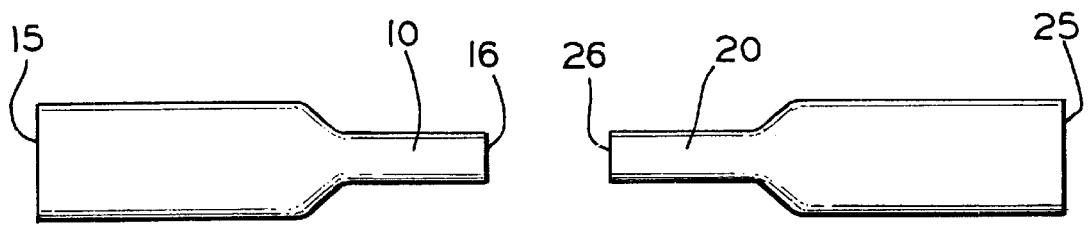
FIG. 3 is a sectional elevational view of the closed channel structural members illustrated in FIG. 2 after having been removed from the respective hydroforming dies and after having the end portions trimmed off.

Following the hydroforming operation, the first and tubes 10 and 20 are removed from the respective hydroforming dies 11 and 21. Then, the end portions 14 of the first tube 10 and the end portions 24 of the second tube 24 are removed in any conventional manner, such as by cutting, to provide truncated first and second tubes 10 and 20, as shown in FIG. 3. The first truncated tube 10 is characterized by a first end portion having a relatively large diameter end surface 15 and a second end portion having a relatively small diameter end surface 16. Similarly, the second truncated tube 20 is characterized by a first end portion having a relatively large diameter end surface 25 and a second end portion having a relatively small diameter end surface 26. As will become apparent below, it is preferable that the two enlarged diameter end surfaces 15 and 25 be comparable in size and shape, although such is not required.

Figure 4:
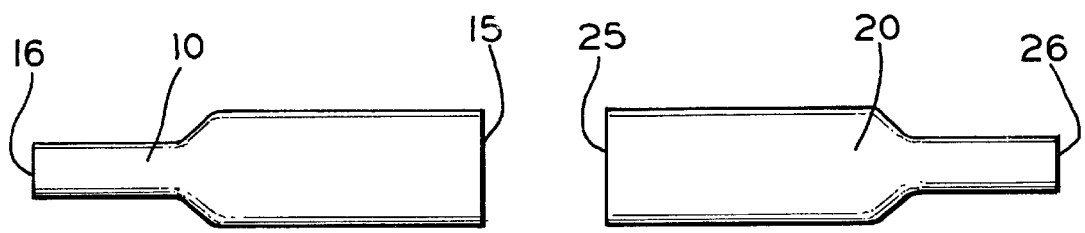
FIG. 4 is a sectional elevational view of the two closed channel structural members illustrated in FIG. 3 after having been reversed in orientation.
Figure 5:
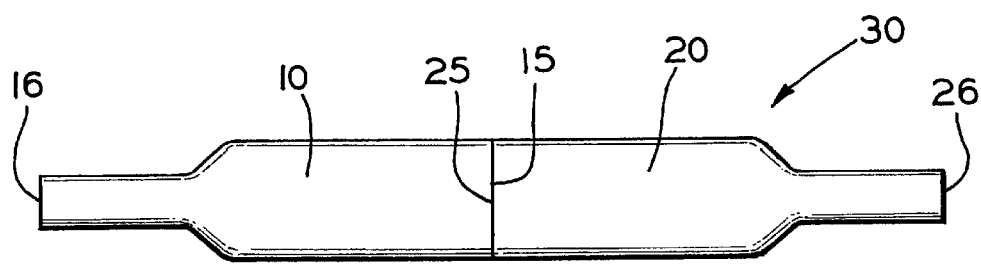
FIG. 5 is a sectional elevational view of the two closed channel structural members illustrated in FIG. 4 after having been secured together to form a unitary side rail.
Figure 6:
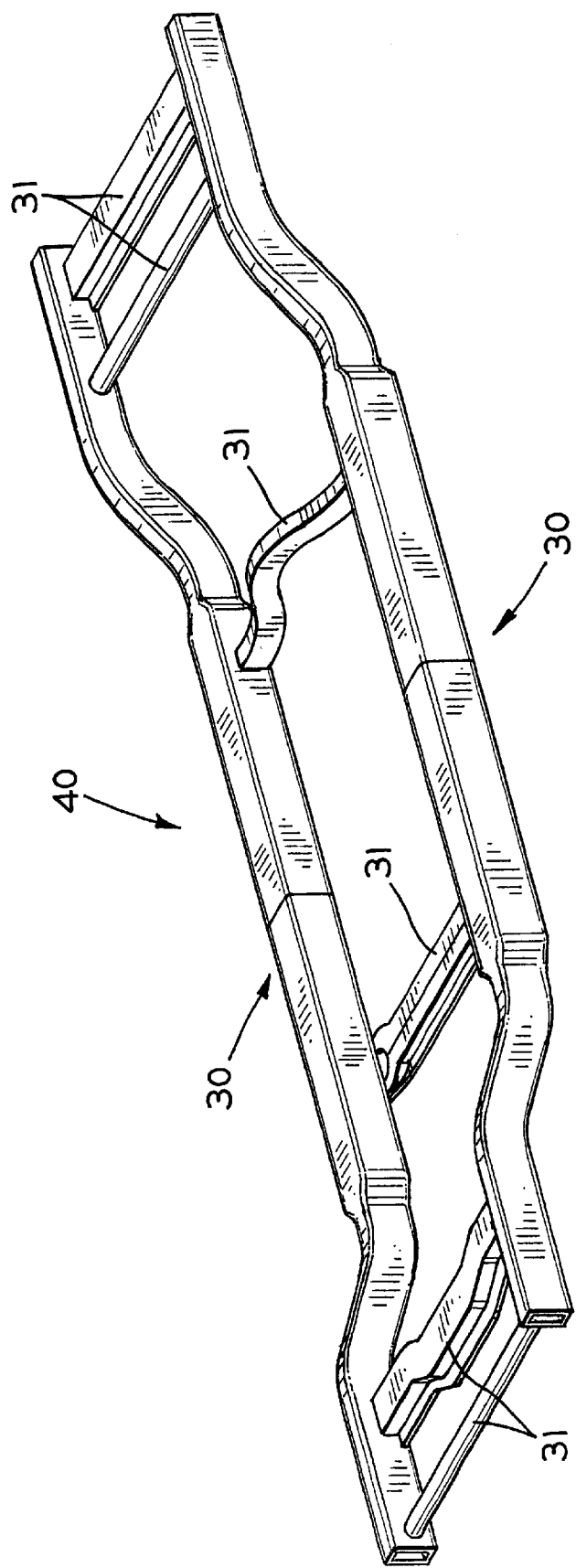
FIG. 6 is a perspective view of a vehicle body and frame assembly including a pair of side rails manufactured in accordance with the method illustrated in FIGS. 1 through 5.

Next, as shown in FIG. 4, the two tubes 10 and 20 are then oriented such that the two enlarged diameter end surfaces 15 and 25 are disposed adjacent to one another. Lastly, such enlarged diameter end surfaces 15 and 25 are joined together in any conventional manner, such as by butt welding in FIG. 5, to form a unitary member, indicated generally at 30. Such joining can be facilitated by forming the two enlarged diameter end surfaces 15 and 25 to be comparable in size and shape, as mentioned above. The unitary member 30 is characterized by a relatively large diameter central portion extending between a pair of relatively small diameter end portions. The unitary member 30 can, for example, be used as a component of a vehicle body and frame assembly. FIG. 6 illustrates one example of a vehicle body and frame assembly, indicated generally at 40, wherein two of such unitary members 30 are provided as side rails in a ladder type frame assembly having a plurality of cross members 31 extending therebetween. It will be appreciated that the unitary member 30 can be sized and shaped for use as any type of vehicle frame component in any type of vehicle body and frame assembly.

Thus, it will be appreciated that in accordance with the method of this invention, the first and second tubes 10 and 20 are each initially deformed to have a relatively small diameter first end portion and a relatively large diameter second end portion. Thereafter, the deformed tubes 10 and 20 are secured together such that the final unitary member 30 has a relatively large diameter central portion extending between a pair of relatively small diameter end portions. This method allows the initial hydroforming expansion process to occur at or near the ends of the tubes 10 and 20, where it can be performed most conveniently with a minimum amount of reduction in wall thickness. Specifically, the initial hydroforming expansion occurs at locations on the tubes 10 and 20 where the end feeding process has been found to function most satisfactorily. Such end feeding would, as discussed above, be much more difficult if it were attempted to form the unitary member 30 directly. This is because it is difficult to perform the end feeding process effectively when the interior portion being expanded is located relatively far from the ends portions, when the overall length of the closed channel structural member is relatively long, and when the shape of the closed channel structural member is not relatively straight.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a vehicle frame assembly comprising the steps of:
   (a) forming a first vehicle frame component having a relatively large dimension central portion extending between a pair of relatively small dimension end portions by:

(1) providing a first closed channel structural member;
(2) hydroforming the first closed channel structural member to have first and second end portions, wherein the first end portion defines a first dimension that is larger than a second dimension defined by the second end portion;
(3) providing a second closed channel structural member;
(4) hydroforming the second closed channel structural member to have first and second end portions, wherein the first end portion defines a first dimension that is larger than a second dimension defined by the second end portion; and
(5) securing the first end portion of the first closed channel structural member to the first end portion of the second closed channel structural member section to form the first vehicle frame component having a relatively large dimension central portion extending between a pair of relatively small dimension end portions;

(b) providing a plurality of second vehicle frame components; and (c) securing the first vehicle frame component and the plurality of second vehicle frame components together to form the vehicle frame assembly.

2. The method defined in claim 1 wherein said step (a)(2) further includes the step of end feeding the first closed channel structural member during said hydroforming.

3. The method defined in claim 1 wherein said step (a)(4) further includes the step of end feeding the second closed channel structural member during said hydroforming.

4. The method defined in claim 1 wherein said steps (a)(2) further includes the step of end feeding the first closed channel structural member during said hydroforming, and wherein said step (a)(4) further includes the step of end feeding the second closed channel structural member during said hydroforming.

5. The method defined in claim 1 wherein said step (b) is performed by forming one of the plurality of second vehicle frame components by:

(1) providing a first closed channel structural member;
(2) hydroforming the first closed channel structural member to have first and second end portions, wherein the first end portion defines a first dimension that is larger than a second dimension defined by the second end portion;
(3) providing a second closed channel structural member;
(4) hydroforming the second closed channel structural member to have first and second end portions, wherein the first end portion defines a first dimension that is larger than a second dimension defined by the second end portion; and
(5) securing the first end portion of the first closed channel structural member to the first end portion of the second closed channel structural member section to form the one of the plurality of second vehicle frame components.

6. The method defined in claim 5 wherein said steps (c) includes the step of securing the first vehicle frame component, the one of the second vehicle frame components, and the remaining ones of the second vehicle frame components together to form the vehicle frame assembly.

* * * * *